United States Patent [19]

Reynolds

[11] Patent Number: 4,494,770
[45] Date of Patent: Jan. 22, 1985

[54] VEHICLE SUSPENSION SYSTEM

[76] Inventor: Charles W. Reynolds, 350 E. 13th St., Beaumont, Calif. 92223

[21] Appl. No.: 498,105

[22] Filed: May 25, 1983

[51] Int. Cl.³ .............................................. B60G 5/02
[52] U.S. Cl. .................................................. 280/685
[58] Field of Search ....................... 280/676, 683, 685

[56] References Cited

U.S. PATENT DOCUMENTS

| | | | |
|---|---|---|---|
| 2,493,024 | 1/1950 | Pointer | 280/685 |
| 3,202,439 | 8/1965 | Hickman | 280/685 |
| 3,387,857 | 6/1968 | Roberts | 280/685 |
| 3,434,733 | 3/1969 | Hume | 280/685 |
| 3,582,105 | 6/1971 | Reynolds | 280/685 |
| 4,099,740 | 7/1978 | McGee | 280/683 |
| 4,360,220 | 11/1982 | Beers | 280/685 |

Primary Examiner—Richard A. Bertsch
Attorney, Agent, or Firm—I. Louis Wolk

[57] ABSTRACT

This invention relates to a vehicle suspension system having one or more axles, and wheels carried by the axles, in which a member which supports the body of the vehicle is attached to said axle housing and is spaced therefrom and is supported by a structure which extends laterally inward beneath the vehicle body, said structure bearing a resilient cushioning member in contact with another similar structure attached to the vehicle body or another axle, whereby an improvement in weight distribution and shock absorption is obtained.

5 Claims, 5 Drawing Figures

VEHICLE SUSPENSION SYSTEM

BACKGROUND OF THE INVENTION

Vehicle suspensions which support vehicle frames or bodies generally comprise axles bearing wheels in which the body weight is supported upon cushioning devices such as springs, shock absorbers, etc. positioned above the axles and in a manner in which the weight and absorption of shock are borne directly by the axles through said cushioning devices.

In U.S. Pat. No. 3,582,105, the present inventor has described a vehicle suspension in which the wheels are carried excentrically by the axles in which the axles tend to rotate bodily about their axes in response to imposition of body weight and in which a cushioning device in the form of a spring or rubber boot is positioned between the axles to yieldably resist rotation of the axles and absorb horizontal compression.

SUMMARY OF THE INVENTION

The object of the present invention is to provide means for supporting the body weight upon members attached to and spaced from the axles or housings therefor, said members being axially rotatable upon bearings in response to load and road irregularities together with a rigid structure interconnecting the weight supporting members and the axles or housings which extend centrally beneath the vehicle body and engage a cushioning device in the form of an air bag or spring which in turn engages a corresponding structure attached to another axle or the body of the vehicle. This then ensures that the load upon the vehicle and absorption of road shock is transmitted to the centrally positioned cushioning member. At the same time, since the body supporting member is axially rotatable, it is responsive to changes in load weight.

The present invention is applicable to trailers of any type whether for carrying of heavy loads in a tractor-trailer truck, or for haulage of house or boat trailers with an automobile or other vehicle. It may also be used as a support structure for railway cars, airplane landing assemblies, etc., and for drive axles on trucks or truck tractors.

DETAILED DESCRIPTION OF THE INVENTION

Figure 1:
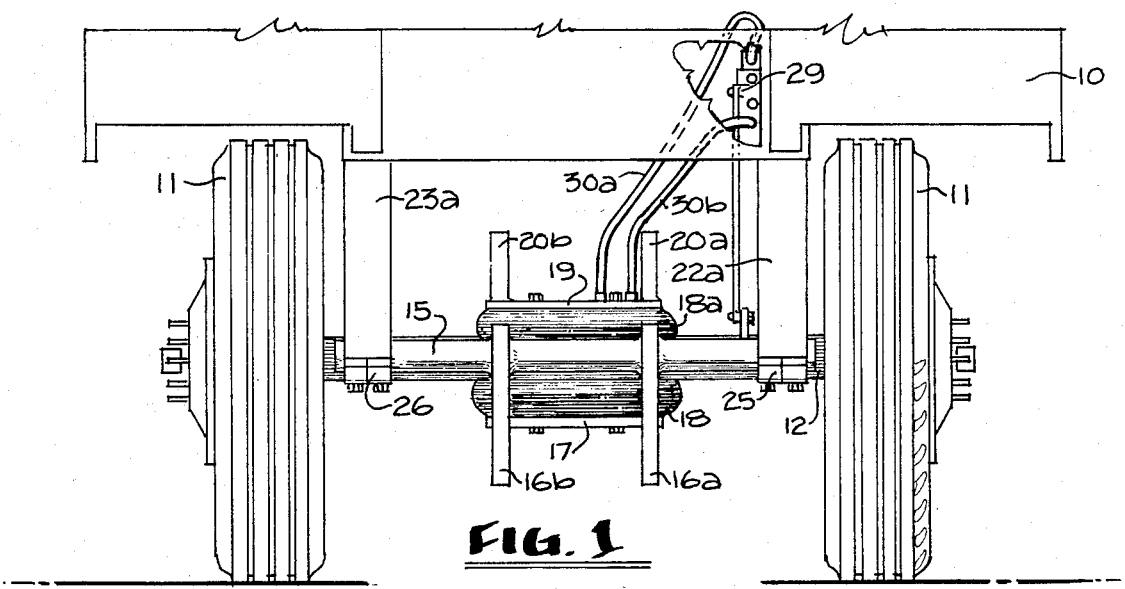
FIG. 1 is a front view in elevation showing the inventions supporting the body frame of a vehicle.
Figure 2:
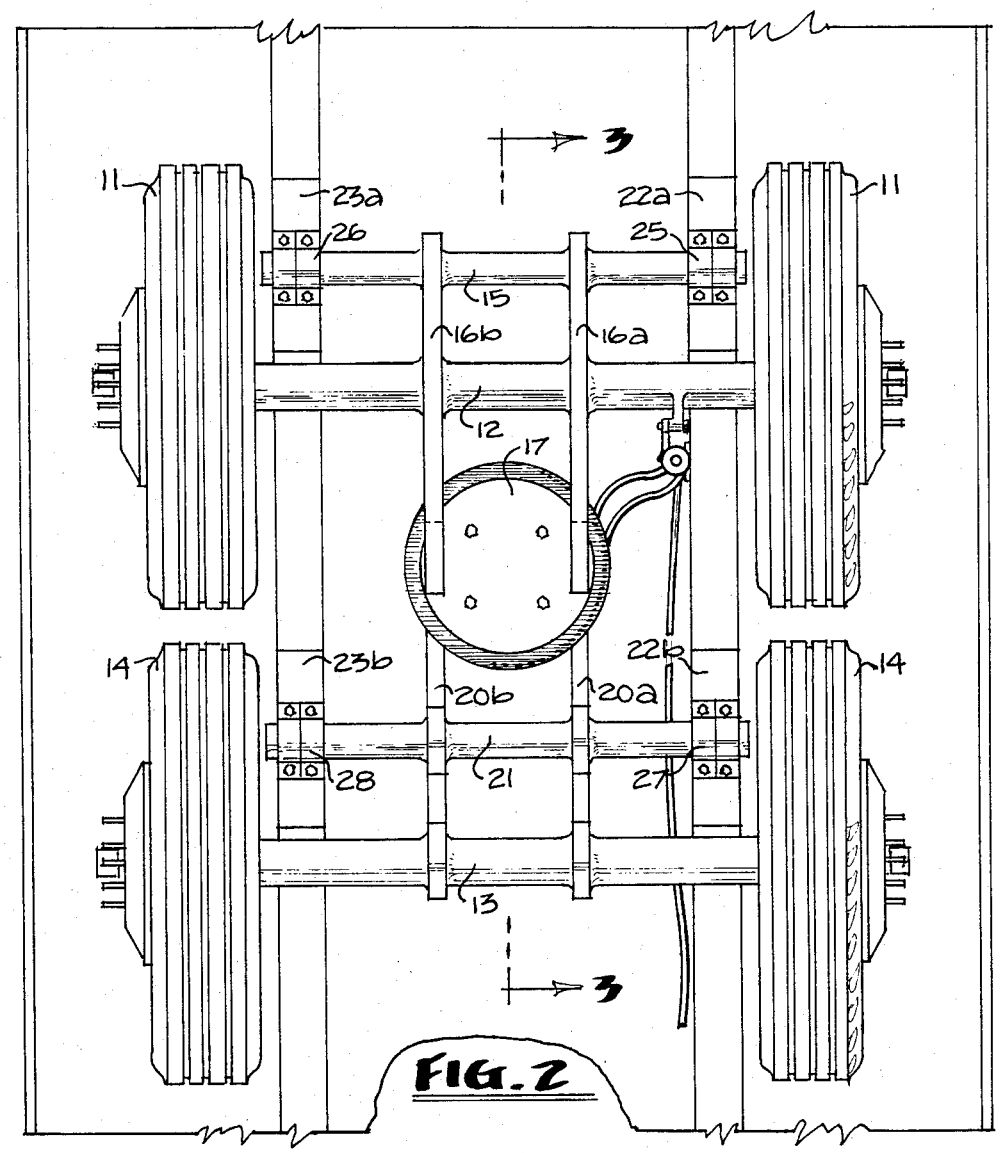
FIG. 2 is view in elevation looking upward from the bottom of FIG. 1.
Figure 3:
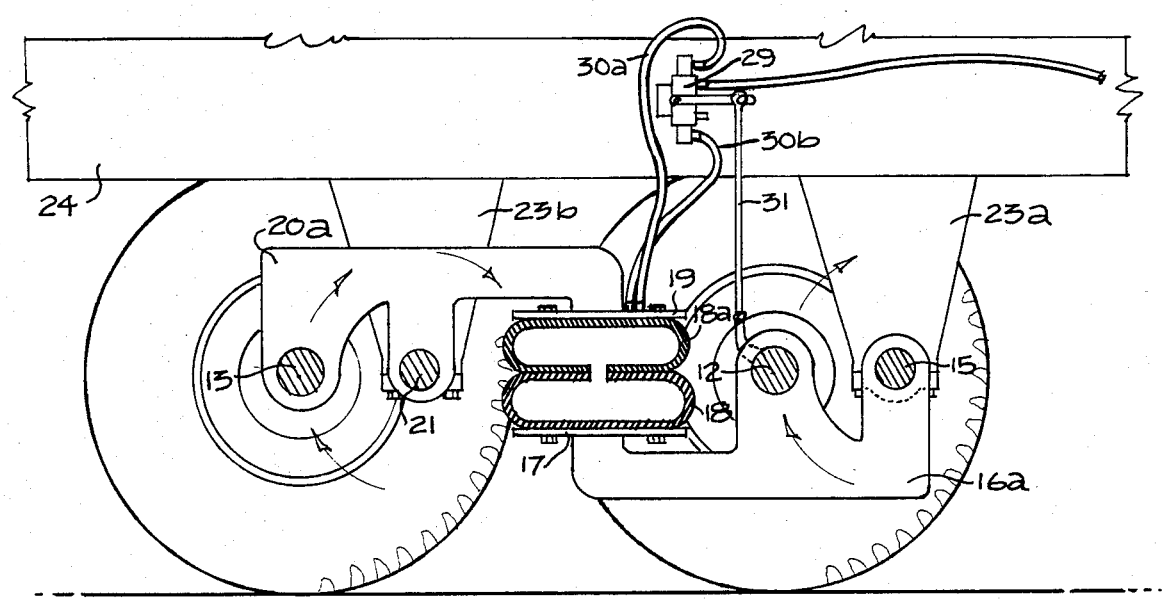
FIG. 3 is a vertical view partly in cross section along lines 3—3 of FIG. 1.

As shown in FIGS. 1, 2, and 3 a vehicle 10 is provided with a front pair of wheels 11 vertically mounted upon an axle 12 and a rear pair of wheels 14 mounted upon axle 13. Positioned in front of and spaced parallel to axle 12 is an axis bar 15. This bar is rigidly secured to the axle by welding by means of a pair of steel members 16a and 16b which extend rearward and which support a platform 17 upon which an air bag 18 is mounted between 17 and plate 19 which is attached to rigid members 20a and 20b which are welded to a rear axis bar 21 which is parallel to and spaced in front of rear axle 13. Instead of separate arms 16a and 16b, and 20a and 20b, these may be replaced by single rigid members of sufficient strength between which the air bag supporting members may be positioned. The vehicle body 10 is supported front and rear at each side by struts 22a and 22b and 23a and 23b which may be formed integrally with a longitudinal supporting member 24 on one side as shown in FIG. 3 and similarly on the other side, or may be separately attached to the vehicle frame. Struts 22a and 23a are supported upon bearings 25 and 26 and in turn support the front section of the vehicle directly upon axis rod 15. Struts 22b and 23b, similarly rest upon bearings 27 and 28 and support the rear section of the vehicle directly upon axis rod 21. Air pressure in the air bag is automatically controlled in response to the weight of the load by means of a conventional controller mounted on the vehicle support frame and air supply hoses 30a and 30b. The air supply to the air bag is regulated by means of a mechanical linkage 31 to the front axis rod assembly responsive to the axial movement thereof responsive to the load.

Figure 5:
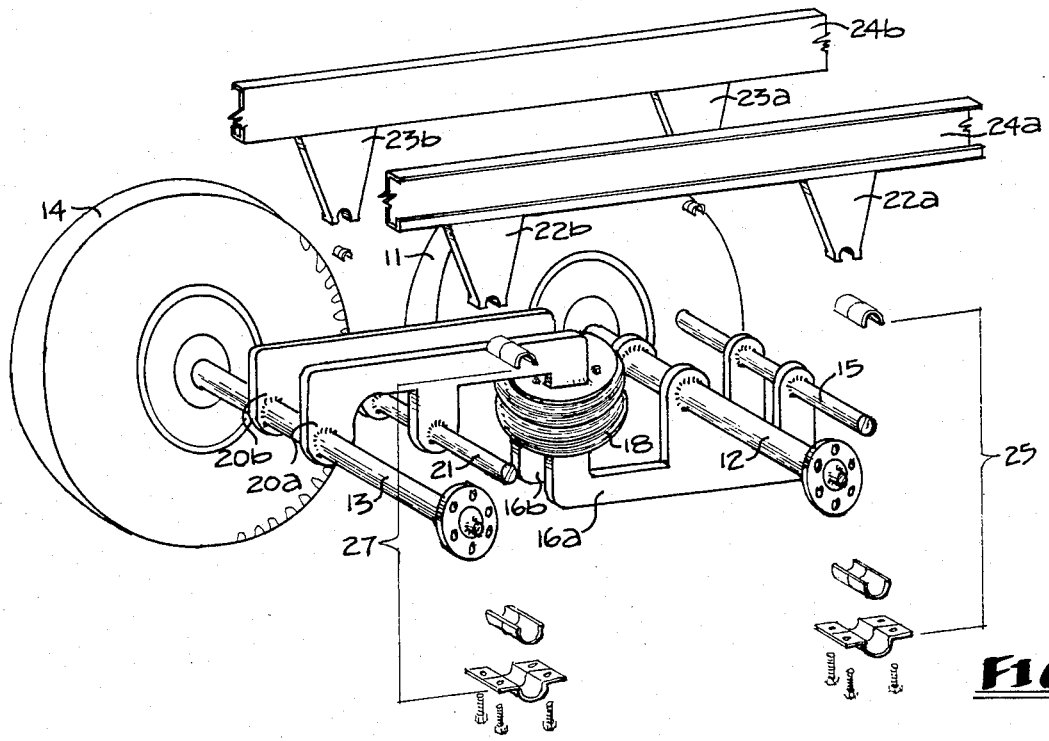
FIG. 5 is an exploded view in elevation showing the essential components of the invention partially disassembled.

In FIG. 5, the structural components of FIGS. 1, 2, and 3 are shown partially disassembled illustrating the manner in which the various elements interact with the longitudinal vehicle supporting members 24a and 24b, which represent the vehicle supporting member 24 and its corresponding member as described in connection with FIG. 3.

Figure 4:
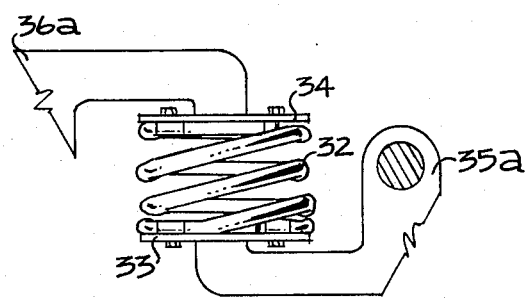
FIG. 4 is a view in elevation showing an alternate type of cushioning structure.

As shown in FIG. 4, a vertically positioned helical coil spring may be used to replace the air bag, although for most applications, an air bag may be preferable since the air pressure can be regulated responsive to load conditions. As shown, a spring 32 is supported between plates 33 and 34, which in turn are supported by arms 35a and 36a and corresponding arms at opposite sides not shown.

The structure described above will function in the following manner: The vehicle load is directly supported on the axis arms or rods upon which vehicle supporting struts are yieldably mounted upon bearings. These arms in turn are rigidly secured to the axles which carry the vehicle wheels and to supports for a cushioning member such as an air bag or spring positioned between the axles beneath the vehicle for the purpose of cushioning changes in load transmitted from the axis arms and wheels. Spacing of the axis arms from the axle and transmission of load changes by axial rotation of the axis arms and to the cushioning member causes efficient handling of load changes and road irregularities due to the leverage between the arms, the axle and the cushioning member.

Although described above with respect to one pair of axles in tandem, the structure described may be used in vehicle support system utilizing three or more pairs of axles in tandem. In addition, the invention may be applied to a trailer utilizing a single axle in which the vehicle is supported upon a pair of struts positioned upon an axis arm mounted in front of the axle and having an air bag or spring carried by an arm attached to the axis rod and axle extending inward and centrally under the vehicle, the air bag or the like being supported between a plate attached by an arm directly to the rear area of the vehicle support.

What is claimed is:

1. In combination with a vehicle body a suspension, an axle bearing a pair of wheels, an arm positioned in front of and parallel to and spaced from said axle, and rigidly secured thereto, means at each side of said arm extending vertically thereto to support said vehicle body said support means having bearing surfaces in engagement with said arm to permit axial movement with respect thereto, a rigid member secured to said arm and said axle and extending centrally beyond said axle beneath the vehicle body with means for supporting a cushioning member, and another rigid member in engagement with the opposite side of said cushioning member at one end with its other end in supporting engagement with the vehicle body, said cushioning member being positioned vertically between said rigid members.

2. A suspension according to claim 1 wherein a pair of axles with wheels are positioned in tandem and wherein an arm is positioned in front of and spaced from and parallel to each axle, each said arm having a pair of vehicle supporting members positioned thereon with bearings to permit axial movement relative thereto and a cushioning member being positioned between the axles supported vertically between rigid members secured to said arms and axles and extending centrally beneath said vehicle body from said arms and axles.

3. A suspension according to claim 2 wherein the cushioning means is an air bag.

4. A suspension according to claim 3 wherein the air pressure within the air bag is controlled by the degree of axial movement of an arm.

5. A suspension according to claim 3 wherein the cushioning means is a coil spring positioned vertically.

* * * * *